C. P. MARYE.
METHOD OF MAKING BOLT NUTS.
APPLICATION FILED FEB. 1, 1919.
1,390,631. Patented Sept. 13, 1921.
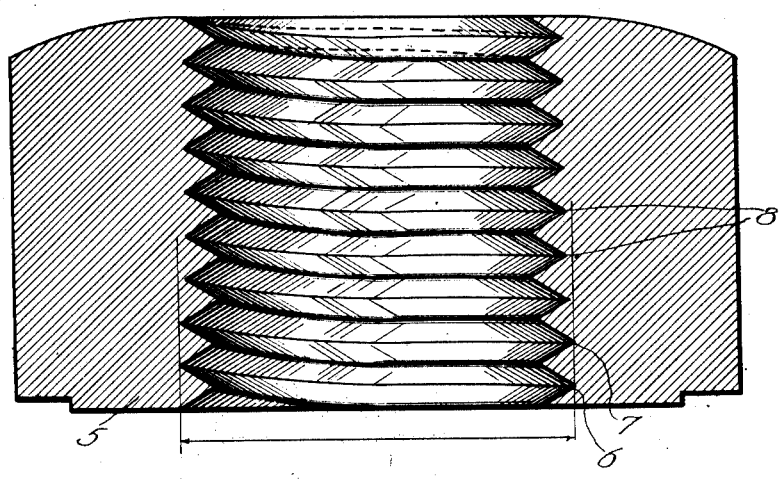
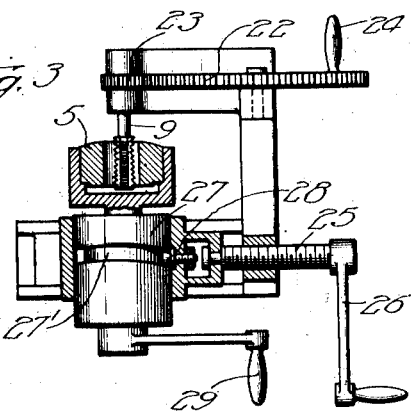
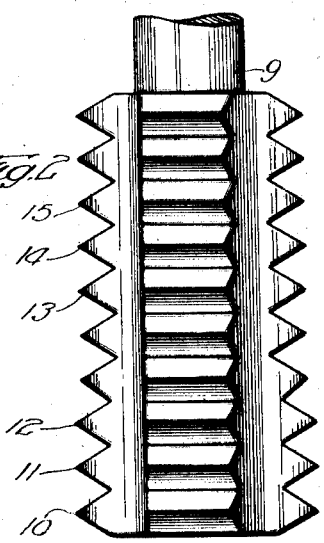
WITNESSES:
INVENTOR
Clifford P. Marye
BY
ATTORNEYS

UNITED STATES PATENT OFFICE.

CLIFFORD P. MARYE, OF CHICAGO, ILLINOIS, ASSIGNOR TO MARYE SAFETY NUT CORPORATION, A CORPORATION OF ILLINOIS.

METHOD OF MAKING BOLT-NUTS.

1,390,631.  Specification of Letters Patent.  Patented Sept. 13, 1921.

Application filed February 1, 1919. Serial No. 274,447.

*To all whom it may concern:*

Be it known that I, CLIFFORD P. MARYE, a citizen of the United States, residing at Chicago, in the county of Cook and State of Illinois, have invented certain new and useful Improvements in Methods of Making Bolt-Nuts, of which the following is a specification.

My invention relates to a method of making bolt nuts and has especial reference to self securing nuts.

One of the objects of the invention is to provide a method of procedure for simultaneously milling all of the convolutions of threads, of a threaded structure, and generating the leads of the threads by axially advancing the thread cutting operation coincidentally.

Another object is to provide a method of procedure, such as described in the preceding paragraph, in which the axial advancement is effected at an irregular speed to generate a un-uniform lead to the threads.

Another object of my invention is to provide a method of making bolt nuts, in one form of which the threads are anomalous, but in which the thread pitch of the convolutions are uniform, with respect to each other.

In pursuing my mode of procedure the threads are made in the bore of the nut, which may be done by the use of a milling tool, being made to bear upon one side of the axis of the nut in such manner that the initial points of all of the convolutions are thereby defined and cut at one and the same time and while the cutting operation is being performed, by the rotating milling tool, the tool and nut are relatively moved about the axis of the tool and at the same time they are relatively moved in an axial direction to define the pitch and character of the threads. In some instances this axial movement may be effected at a varying or un-uniform speed rate with respect to the other said movements. The result of this latter procedure is that the threads of the nut are made to diverge from a true spiral, thereby producing in the threads a deviation from the true pitch line, by departing from the pitch line to a greater or less extent in either or both directions, but maintaining a uniform pitch of the threads with respect to each other.

A nut having aberrant or waved threads of this character, when turned upon a bolt having threads of uniform spiral configuration, of the standard type, will cause an abnormal friction engagement between the threads of the nut and of the bolt, which exerts a stress tending to straighten the threads of the nut into a true spiral formation, corresponding with the threads of the bolt, and some resilient displacement of the threads of the nut will take place in order to accommodate themselves to the thread of the bolt, and the threads of the bolt are similarly stressed to conform to the character of threads within the nut.

The effect of the axially undulating or waved threads of the nut and of the normal spiral threads of the bolt, is such that the threads of one will be caused to conform to a greater or less extent, to the threads of the other without destruction of the threads of either the nut or the bolt, and therefore, when the strain is released, by unscrewing the nut from the bolt the threads of each will reassume to a greater or less extent, their normal relative positions. Therefore, the nut may be threaded or turned upon the bolt and retracted and removed therefrom a number of times, without causing material variation in the resistance to movement, as a result of the peculiar character of the encountering threads.

In the accompanying drawings forming part hereof:

Figure 1 is an enlarged diametrical section of a nut made in accordance with my method of procedure.

Fig. 2 is a milling tool, that may be employed in making the nut.

Fig. 3 is a schematic representation of a means for carrying my invention into effect.

In all the views the same reference characters are employed to indicate similar parts.

I have shown a nut having anomalous threads, made by my method of procedure, because the standard nut having threads of true spiral formation and that may be made by practice of my invention is familiar and well known.

The nut 5 is provided with a series of threads having two bolt-entrant convolutions 6 and 7, somewhat larger in diameter than the convolutions 8, but of the same pitch and character as the convolutions of the remaining portion of the threaded spiral. The object of this is to permit the bolt to enter freely into the nut and into threaded relation with the nut orifice. The milling cutter 9, for cutting the threads in the nut is provided with a series of teeth such as 10, 11 and 12, which will cut spirals of larger diameter than the teeth 13, 14 and 15, etc. The latter teeth are of the same diameter but differ in diameter from the teeth 10, 11 and 12. All of the threads are, however, of the same pitch and character. The series of teeth 10, 11 and 12 will cut the threads 6 and 7 of the nut, on the entrant side thereof, while the remaining teeth will cut the threads in the main body of the nut.

In carrying my invention into effect I rotate the cutter 9 at a relatively high velocity to give it cutting effect and so present the nut to the cutter that the cutter will cut all of the thread convolutions in one side of the nut orifice at one and the same time. After the cutter has been set into rotation, at suitable velocity, the nut and cutter are relatively moved with respect to each other in a direction at substantial right angles to their respective axes, so that the teeth of the cutter will cut into the standard nut a distance requisite for the depth of the threads. After this has been done the nut and cutter are then relatively moved about their axes, and coincidently are axially moved with respect to each other to determine the lead or pitch line and character of the threads. In order to produce the threads of the peculiar wave character disclosed herein, the axial movement of the nut or cutter, or both, is not uniform, but to the contrary, the rate of movement is variable. If this movement were uniform then a nut having threads forming a true spiral, would be produced, but inasmuch as this movement is not uniform, the spiral is not a true one, but resembles the structure clearly depicted in the drawings.

The milling cutter 9, must be rotated and for this purpose I have shown a spur gear 22 in mesh with the pinion 23 which directly rotates the cutter. The handle 24 is a means by which rotation may be effected.

The diametric movement of the nut, with respect to the cutter may be effected by the screw 25, rotatable by the handle 26. The cam 27, in association with the fixed part 28, will advance the nut axially toward the cutter at a speed rate determined by the configuration of the cam groove 27'. The cam and nut may be rotated by means of the handle 29. One revolution of the cam 27 will be sufficient to define all of the threads within the nut and the axial movement of the nut is progressing while its rotative movement is being effected.

Of course, the cutters may be axially moved toward the nut or they may be moved axially toward each other while the threads are being circumferentially extended within this nut orifice. If this movement is uniform, threads of a standard nut will be produced and if it is irregular the threads will be correspondingly irregular, similar in configuration to the nut illustrated herein.

Having described my invention, what I claim is:—

1. Steps in the method of making bolt nuts which consists in producing the threads of all of the convolutions coincidentally; by continuing the thread producing operation circumferentially throughout the interior of the nut opening and axially advancing the thread formation at an irregular speed rate during said operation to produce an anomalous thread spiral.

2. Steps in the method of forming screw threads which consist in producing the threads of all of the convolutions of a threaded object coincidently by continuing the thread producing operation circumferentially throughout the threaded region and axially advancing the thread formation at an inconstant speed rate during said operation to produce an anomalous thread spiral.

In testimony whereof I hereunto subscribe my name.

CLIFFORD P. MARYE.